(12) United States Patent
Zheng (10) Patent No.: US 11,367,232 B2
(45) Date of Patent: Jun. 21, 2022

(54) METHOD AND DEVICE FOR GENERATING STICKERS

(71) Applicant: Beijing Dajia Internet Information Technology Co., Ltd., Beijing (CN)

(72) Inventor: Chi Zheng, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/079,051

(22) Filed: Oct. 23, 2020

(65) Prior Publication Data

US 2021/0042978 A1    Feb. 11, 2021

(30) Foreign Application Priority Data

Oct. 25, 2019 (CN) .......................... 201911024867.X (51) Int. Cl.
*G06T 11/60* (2006.01)
*G06F 40/109* (2020.01)
*G06F 40/106* (2020.01)
*G06T 11/00* (2006.01)

(52) U.S. Cl.
CPC ............ *G06T 11/60* (2013.01); *G06F 40/106* (2020.01); *G06F 40/109* (2020.01); *G06T 11/001* (2013.01)

(58) Field of Classification Search
CPC ...... G06T 11/60; G06T 11/001; G06F 40/109; G06F 40/106
See application file for complete search history.

(56) References Cited

U.S. PATENT DOCUMENTS

| 8,739,054 | B2 * | 5/2014 | Ikedo | G06F 40/103 715/769 |
| 10,990,246 | B1 * | 4/2021 | Law | G06F 3/0482 |
| 2005/0094206 | A1 * | 5/2005 | Tonisson | G06F 40/103 358/1.18 |
| 2008/0095470 | A1 * | 4/2008 | Chao | G06T 3/0012 382/173 |
| 2009/0217187 | A1 * | 8/2009 | Kendall | G06T 3/00 715/765 |
| 2010/0122158 | A1 * | 5/2010 | Tarumi | G06F 40/103 715/243 |
| 2010/0199173 | A1 * | 8/2010 | Morooka | G06F 3/1208 715/246 |
| 2014/0013216 | A1 * | 1/2014 | Sakuta | G06F 40/103 715/252 |
| 2014/0195921 | A1 * | 7/2014 | Grosz | G06Q 30/0601 715/738 |

(Continued)

*Primary Examiner* — Yu Chen
(74) *Attorney, Agent, or Firm* — Knobbe, Martens, Olson & Bear, LLP (57) ABSTRACT

The disclosure relates to a method and a device for generating a sticker. The method and device can receive a sticker configuration file from a server, where the sticker configuration file includes configuration parameters, and the configuration parameters represent display styles of a background image element and at least one text element in a target sticker to be generated; acquire a sticker background image and sticker characters input by a user as the background image element and the at least one text element respectively; and generate the target sticker according to the background image element, at least one the text element and the configuration parameters.

8 Claims, 3 Drawing Sheets

(56) References Cited

U.S. PATENT DOCUMENTS

| | | | | |
|---|---|---|---|---|
| 2014/0245115 | A1* | 8/2014 | Zhang | G06F 40/103 |
| | | | | 715/202 |
| 2016/0277633 | A1* | 9/2016 | Kawakami | H04N 1/00251 |
| 2018/0032481 | A1* | 2/2018 | Ishida | G06F 3/0485 |
| 2018/0081515 | A1* | 3/2018 | Block | G06F 3/04817 |
| 2018/0249200 | A1* | 8/2018 | Wang | H04N 21/41407 |
| 2019/0108236 | A1* | 4/2019 | Balachandran | G06F 16/211 |
| 2020/0005513 | A1* | 1/2020 | Li | G06F 3/04845 |
| 2020/0272309 | A1* | 8/2020 | Xiao | H04N 21/443 |
| 2020/0372692 | A1* | 11/2020 | Ge | G06T 11/00 |

* cited by examiner

METHOD AND DEVICE FOR GENERATING STICKERS

This application is based on and claims priority under 35 U.S.C 119 to Chinese Patent Application No. 201911024867.X, filed on Oct. 25, 2019, in the China National Intellectual Property Administration. The entire disclosure of the above application is incorporated herein by reference.

FIELD

The disclosure relates to the technical field of video processing, in particular to a method and a device for generating a sticker.

BACKGROUND

In video editing, users typically need to add stickers to videos. The stickers typically include background image elements and text elements.

In the related art, for each sticker, a technician needs to write a piece of program code according to a pre-designed sticker style, so that the sticker corresponding to the piece of code is generated when a terminal executes the piece of code. Every time a new sticker is added, the technician needs to modify the program code to generate the newly added sticker, resulting in low efficiency of generating the sticker.

SUMMARY

According to embodiments of the disclosure, a method for generating a sticker is provided, and the method is applied to a terminal and includes:

receiving a sticker configuration file from a server, wherein the sticker configuration file includes configuration parameters, and the configuration parameters represent display styles of a background image element and at least one text element in a target sticker to be generated;

acquiring a sticker background image and sticker characters input by a user as the background image element and the at least one text element respectively; and generating the target sticker based on the background image element, the based on text element and the configuration parameters.

According to embodiments of the disclosure, the sticker configuration file further includes an image identifier; and said acquiring the sticker background image includes:

acquiring an image corresponding to the image identifier from the server as the sticker background image based on the image identifier; or receiving an image selected by the user from locally stored images as the sticker background image.

According to embodiments of the disclosure, the configuration parameters include: a first parameter and a second parameter configured to represent a width and a height occupied by the at least one text element in the target sticker respectively, a third parameter and a fourth parameter configured to represent a width and a height occupied by the background image element in the target sticker respectively, a fifth parameter configured to represent a position of the at least one text element in the target sticker, and a sixth parameter configured to represent a position of the background image element in the target sticker;

wherein said generating the target sticker includes:

determining the width occupied by the at least one text element in the target sticker based on the first parameter, and determining the height occupied by the at least one text element in the target sticker based on the second parameter;

determining the width occupied by the background image element in the target sticker based on the third parameter, and determining the height occupied by the background image element in the target sticker based on the fourth parameter;

determining a width and a height of the target sticker based on the widths and the heights respectively occupied by the at least one text element and the background image element in the target sticker; and generating the target sticker by performing position constraint on the at least one text element and the background image element, based on the width and the height of the target sticker, the fifth parameter and the sixth parameter.

According to embodiments of the disclosure, the first parameter includes a seventh parameter, and the seventh parameter represents a width occupied by each of the at least one text element in the target sticker; and the second parameter includes an eighth parameter, and the eighth parameter represents a height occupied by the each text element in the target sticker;

said determining the width occupied by the at least one text element, and determining the height occupied by the at least one text element include:

determining the width occupied by the each text element in the target sticker based on the seventh parameter corresponding to the each text element; and determining the height occupied by the each text element in the target sticker based on the eighth parameter corresponding to the each text element.

According to embodiments of the disclosure, said determining the height and the width of the target sticker includes:

determining a maximum width between the width occupied by the at least one text element in the target sticker and the width occupied by the background image element in the target sticker as the width of the target sticker; and determining a maximum height between the height occupied by the at least one text element in the target sticker and the height occupied by the background image element in the target sticker as the height of the target sticker.

According to embodiments of the disclosure, a device for generating a sticker is provided, and the device is applied to a terminal and includes:

a receiving module, configured to receive a sticker configuration file from a server, wherein the sticker configuration file includes configuration parameters, and the configuration parameters represent display styles of a background image element and at least one text element in a target sticker to be generated;

an acquiring module, configured to acquire a sticker background image and sticker characters input by a user as the background image element and the at least one text element respectively; and a generating module, configured to generate the target sticker based on the background image element, the at least one text element and the configuration parameters.

According to embodiments of the disclosure, the sticker configuration file further includes an image identifier; and the acquiring module is configured to acquire a corresponding image from the server as the sticker background image based on the image identifier; or receive an image selected by the user from locally stored images as the sticker background image.

According to embodiments of the disclosure, the configuration parameters include: a first parameter and a second parameter configured to represent a width and a height occupied by the at least one text element in the target sticker respectively, a third parameter and a fourth parameter configured to represent a width and a height occupied by the background image element in the target sticker respectively, a fifth parameter configured to represent a position of the at least one text element in the target sticker, and a sixth parameter configured to represent a position of the background image element in the target sticker;

the generating module includes:

a first determining unit, configured to determine the width occupied by the at least one text element in the target sticker based on the first parameter, and determine the height occupied by the at least one text element in the target sticker based on the second parameter;

a second determining unit, configured to determine the width occupied by the background image element in the target sticker based on the third parameter, and determine the height occupied by the background image element in the target sticker based on the fourth parameter;

a third determining unit, configured to determine a width and a height of the target sticker based on the widths and the heights respectively occupied by the at least one text element and the background image element in the target sticker; and a generating unit, configured to generate the target sticker by performing position constraint on the at least one text element and the background image element, based on the width and the height of the target sticker, the fifth parameter and the sixth parameter.

According to embodiments of the disclosure, the first parameter includes a seventh parameter, and the seventh parameter represents a width occupied by each of the at least one text element in the target sticker; and the second parameter includes an eighth parameter, and the eighth parameter represents a height occupied by the each text element in the target sticker;

the first determining unit is configured to:

determine the width occupied by the each text element in the target sticker based on the seventh parameter corresponding to the each text element; and determine the height occupied by the each text element in the target sticker based on the eighth parameter corresponding to the each text element.

According to embodiments of the disclosure, the third determining unit is configured to:

determine a maximum width between the width occupied by the at least one text element in the target sticker and the width occupied by the background image element in the target sticker as the width of the target sticker; and determine a maximum height between the height occupied by the at least one text element in the target sticker and the height occupied by the background image element in the target sticker as the height of the target sticker.

According to embodiments of the disclosure, a terminal is provided and includes:

a processor; and a memory, configured to store executable instructions of the processor;

wherein the processor is configured to execute the instructions to implement the above method for generating the sticker.

According to embodiments of the disclosure, a storage medium is provided, and when instructions in the storage medium are executed by a processor of a terminal, the terminal implements the above method for generating the sticker.

According to embodiments of the disclosure, a computer program product is provided, and when instructions in the computer program product are executed by a processor of a terminal, the terminal implements the above method for generating the sticker.

It should be understood that the above general descriptions and the following detailed descriptions are exemplary and explanatory only, and are not intended to limit the disclosure.

BRIEF DESCRIPTION OF THE DRAWINGS

The accompanying drawings, which are incorporated in and constitute a part of this specification, illustrate embodiments consistent with the disclosure, together with the specification serve to explain the principles of the disclosure, and are not to be construed as unduly limiting the disclosure.

DETAILED DESCRIPTION OF THE EMBODIMENTS

In order to provide those ordinarily skilled in the art with a better understanding of the technical solution in the disclosure, the technical solution in the embodiments of the disclosure will be described clearly and fully hereinafter in combination with the accompanying drawings.

It should be noted that the terms 'first', 'second', and the like in the specification and claims of the disclosure and the above-mentioned accompanying drawings are used for distinguishing similar objects and not necessarily for describing a particular order or sequential order. It is to be understood that the data so used are interchangeable under appropriate circumstances such that the embodiments of the disclosure described herein are capable of being implemented in sequences other than those illustrated or described herein. The implementations described in the following exemplary embodiments do not represent all implementations consistent with the disclosure. On the contrary, they are merely examples of devices and methods consistent with some aspects of the disclosure as detailed in the appended claims.

Figure 1:
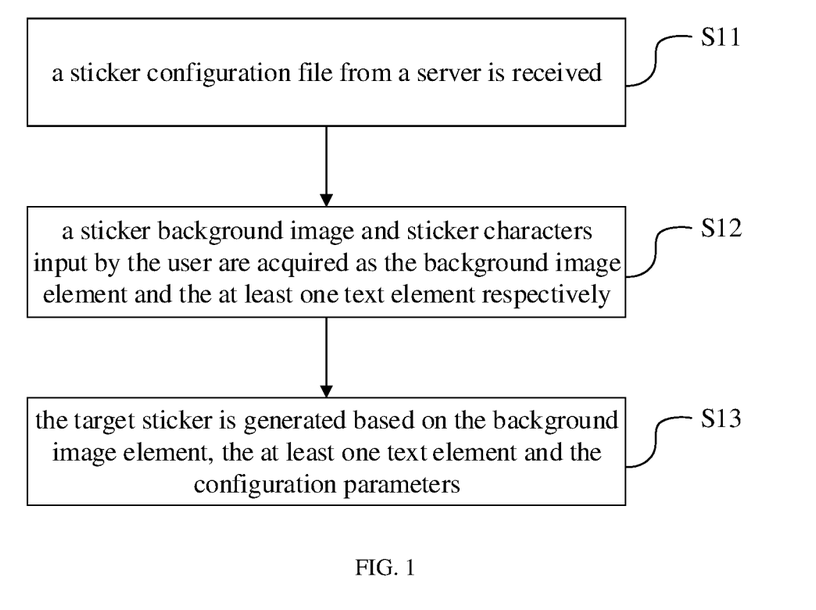
FIG. 1 illustrates a flow chart of a method for generating a sticker according to embodiments of the disclosure.

FIG. 1 illustrates a flow chart of a method for generating a sticker according to embodiments of the disclosure. As shown in FIG. 1, the method for generating the sticker may be applied to a terminal, which may be an electronic device such as a mobile phone, a computer and a tablet. The method for generating the sticker may include the following steps.

In S11, a sticker configuration file from a server is received.

The sticker configuration file includes configuration parameters, and the configuration parameters represent display styles of a background image element and at least one text element in a target sticker to be generated. The target sticker to be generated is a sticker currently required to be generated by a user logging in the terminal.

A technician may set the sticker configuration file based on a style of the sticker needing to be generated, and store the sticker configuration file in the server, and the server may transmit the sticker configuration file to the terminal.

In some embodiments, the terminal may receive the sticker configuration file transmitted by the server.

The configuration parameters included in the sticker configuration file may be as follows.

coverName: indicating a sticker name, and configured to identify the sticker.

coverImage: indicating an identifier of the background image element.

rotation: indicating a default rotation angle.

isCenterX: indicating whether the background image element and the text element are centered left and right.

isCenterY: indicating whether the background image element and the text element are centered up and down.

imageConstraint: indicating a position of the background image element in the sticker.

imageStrechStyle: indicating a stretching style of the background image element, wherein 0 indicates bi-directional stretching (i.e., the same width and height as the sticker), 1 indicates that the background image element can stretch in a transverse direction, 2 indicates that the background image element can stretch in a longitudinal direction, and 3 indicates that the width and the height are fixed.

disableWidthShrink: indicating whether an image width is prohibited from shrinking to be within imageWidth when an image can be stretched.

disableHeightShrink: indicating whether an image height is prohibited from shrinking to be within imageHeight when the image can be stretched.

imageWidth: indicating a width of the background image element.

imageHeight: indicating a height of the background image element.

maxTextMargin: indicating an edge distance of the longest line of text element from the sticker.

lastLineMargin: indicating an edge distance of a last line of text element from the sticker.

numOfLines: indicating that the number of lines in the text element is fixed when numOfLines is greater than 0, and indicating that the number of lines in the text element may be extended when numOfLines is equal to 0.

maxLines: indicating the total number of lines that may be extended in the text element.

lineSpacing: indicating a line spacing of extended characters in the text element.

isLineReverse: indicating whether an extended line in the text element is reversely typeset (top-to-bottom, and right-to-left in vertical typeset by default).

textAlignment: indicating an arrangement mode of the extended line in the text element relative to a first line, wherein 0 indicates left alignment; 1 indicates right alignment; and 2 indicates centered.

isLastLineFixed: indicating whether the extended last line in the text element is fixed in position.

textModel: indicating a parameter configuration for the text element.

textConstraint: indicating a position of the text element in the sticker.

fixedWidth: indicating that a width of the text element is fixed, the more words in a line in the text element, the smaller a font under the condition that a value is greater than 0.

minFontSize: indicating a minimum font for the text element with a fixed width.

maxFontSize: indicating a maximum font for the text element with the fixed width.

fontName: indicating a font name of the text element.

fontSize: indicating a font size of the text element.

textColorString: indicating a font color of the text element.

shadowColorString: indicating a shadow color of the text element.

maxLimitNum: indicating a maximum word limit for a line of characters in the text element.

is Vertical: indicating whether the text element is vertically typeset.

isReverseDirection: indicating whether the text element is reversely typeset.

kerning: indicating a kerning of the text element.

isImageForChar: indicating whether each character in the text element has a background image.

charImage: indicating a background image of each character in the text element.

shouldBeSquare: indicating whether the largest value in the length and the width of a single character form is taken.

charImageIncWidth: indicating a left-right increased width for each character.

charImageIncHeight: indicating an up-down increased height for each character.

In S12, a sticker background image and sticker characters input by the user are acquired as the background image element and the at least one text element respectively.

In some embodiments, the terminal may acquire the sticker background image and use the acquired sticker background image as the background image element for generating the target sticker.

In some embodiments, the sticker configuration file may further include an image identifier, and correspondingly, the terminal may acquire a corresponding image from the server as the sticker background image based on the image identifier in the sticker configuration file.

In some embodiments, the terminal may acquire the coverImage parameter (i.e., the image identifier) in the sticker configuration file, and then the terminal may acquire the corresponding image from the server based on the image identifier, and the acquired image is used as the sticker background image. For example, the image identifier may be an image link, and the terminal may acquire the image from the server as the sticker background image based on the image link.

In addition, the terminal may further select one image from locally stored images as the sticker background image for generating the target sticker based on an instruction of the user, or, the terminal may further acquire an image uploaded by the user as the sticker background image for generating the target sticker.

In addition, the terminal may further acquire the sticker characters input by the user as the text element in the sticker. In some embodiments, the sticker configuration file is provided with at least one style of the text element, the user may select any one style of the text element. Then the user may input characters into the terminal, the characters may be characters in a single line or characters in a plurality of lines, correspondingly, the terminal may take the characters input by the user as the text element, and the style corresponding to the text element is the style of the text element selected by the user.

In S13, the target sticker is generated based on the background image element, the at least one text element and the configuration parameters.

In some embodiments, the terminal may determine positions and styles of the at least one text element and the background image element in the target sticker based on the configuration parameters, and generate the target sticker based on the determined positions and the determined styles.

In the technical solution according to the embodiments of the disclosure, the sticker can be generated through the sticker configuration file, the mode for generating the sticker is simplified, and thus the efficiency for generating the sticker can be improved.

In some embodiments, the configuration parameters may include: a first parameter and a second parameter configured to represent a width and a height occupied by the at least one text element in the target sticker respectively, a third parameter and a fourth parameter configured to represent a width and a height occupied by the background image element in the target sticker respectively, a fifth parameter configured to represent a position of the at least one text element in the target sticker, and a sixth parameter configured to represent a position of the background image element in the target sticker. Correspondingly, referring to FIG. 2, S13 may include the following steps.

Figure 2:
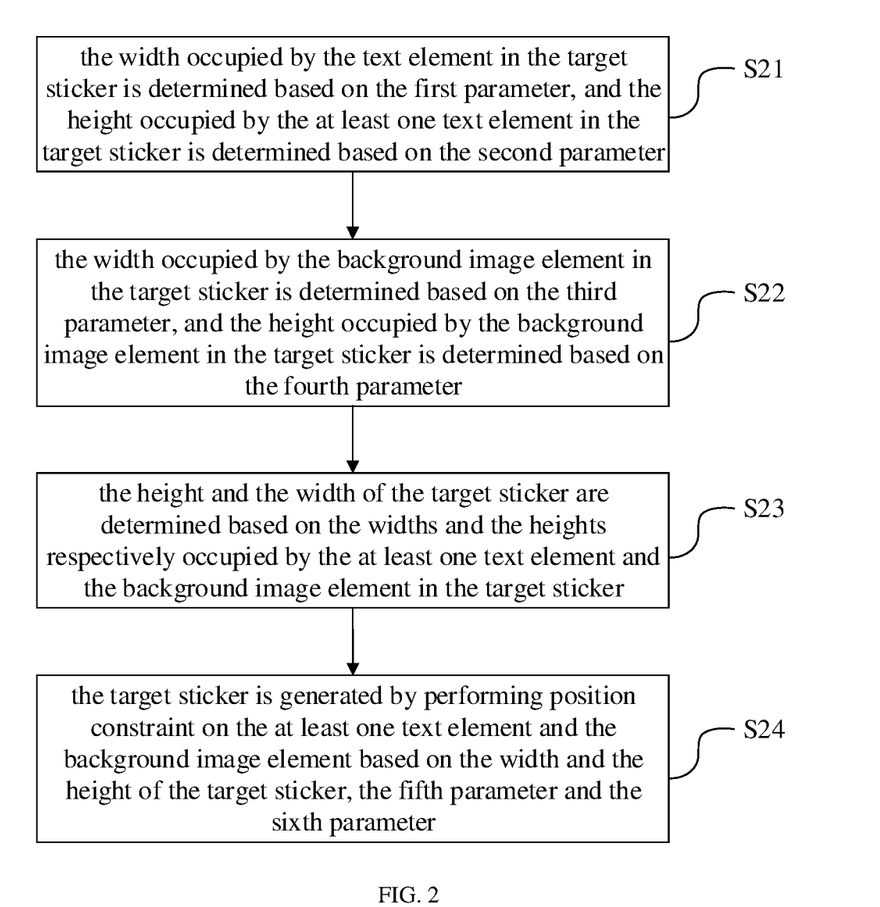
FIG. 2 illustrates a flow chart of a method for generating a target sticker based on a background image element, at least one text element, and configuration parameters according to embodiments of the disclosure.

In S21, the width occupied by the text element in the target sticker is determined according to the first parameter, and the height occupied by the text element in the target sticker is determined according to the second parameter.

In some embodiments, the terminal may determine the width occupied by the text element in the target sticker based on the first parameter, and determine the height occupied by the text element in the target sticker based on the second parameter. In some embodiments, the first parameter includes the width and the height of the text element, and the edge distance of the text element from the target sticker, and when the text element is transversely typeset, the terminal may calculate a sum of edge distances of a left part and a right part of the text element from the target sticker and the width of the text element as the width occupied by the text element in the target sticker. When the text element is transversely typeset, the terminal may also calculate a sum of edge distances of an upper part and a lower part of the text element from the target sticker and the height of the text element as the height occupied by the text element in the target sticker.

When the text element is longitudinally typeset, the terminal may calculate a sum of edge distances of the upper part and the lower part of the text element from the target sticker and the height of the text element as the width occupied by the text element in the target sticker. When the text element is longitudinally typeset, the terminal may also calculate a sum of edge distances of the left part and the right part of the text element from the target sticker and the width of the text element as the height occupied by the text element in the target sticker.

The text element may include one or more lines of characters, and when the text element includes one line of characters, the height of the one line of characters may be taken as the height of the text element. When the text element includes n lines of characters, lineSpacing×(n−1)+n×text.hight may serve as the height of the text element, wherein lineSpacing is the line spacing and text.hight is the height of each line of characters.

In S22, the width occupied by the background image element in the target sticker is determined based on the third parameter, and the height occupied by the background image element in the target sticker is determined based on the fourth parameter.

In some embodiments, the terminal may determine the width occupied by the background image element in the target sticker based on the third parameter, and determine the height occupied by the background image element in the target sticker based on the fourth parameter.

In some embodiments, the third parameter may include an imageStrechStyle parameter, a disableWidthShrink parameter, a disableHeightShrink parameter, an imageConstraint parameter, an imageWidth parameter, and an imageHeight parameter.

When the text element and the background image element are transversely typeset, the imageStrechStyle parameter indicates that the width and the height of the background image element are fixed, or the imageStrechStyle parameter indicates that the background image element may be longitudinally stretched, or the imageStrechStyle parameter indicates that the background image element may be transversely stretched, and the disableWidthShrink parameter indicates that the width of the background image element cannot be smaller than the width of the background image element indicated by the imageWidth parameter, the width occupied by the background image element in the target sticker is:

maxImageWidth=imageConstraint.left+imageConstraint.right+imageWidth

Wherein imageConstraint.left indicates a distance of the left side of the background image element from a left border of the target sticker, imageConstraint.right indicates a distance of the right side of the background image element from a right border of the target sticker, and imageWidth indicates a length of the background image element in the transverse direction.

When the text element and the background image element are longitudinally typeset, the imageStrechStyle parameter indicates that the width and the height of the background image element are fixed, or the imageStrechStyle parameter indicates that the background image element may be stretched in a height direction of the image, or the imageStrechStyle parameter indicates that the background image element may be transversely stretched, and the disableHeightShrink parameter indicates that the width of the background image element cannot be smaller than the width of the background image element indicated by the imageWidth parameter, the width occupied by the background image element in the target sticker is:

maxImageWidth=imageConstraint.top+imageConstraint.bottom+imageHeight

Wherein imageConstraint.top indicates a distance of the upper side of the background image element from an upper border of the target sticker, imageConstraint.bottom indicates a distance of the lower side of the background image element from a lower border of the target sticker, and imageWidth indicates the width of the background image element.

In S23, the height and the width of the target sticker are determined based on the widths and the heights respectively occupied by the at least one text element and the background image element in the target sticker.

The height of the target sticker should be equal to a maximum value between the height occupied by the text element and the height occupied by the background image element in the target sticker, and the width of the target sticker should be equal to a maximum value between the width occupied by the text element and the width occupied by the background image element in the target sticker.

Based on the above, the terminal may determine the height and the width of the target sticker based on the widths and the heights respectively occupied by the text element and the background image element in the target sticker.

In S24, the target sticker is generated by performing position constraint on the text element and the background image element based on the width and the height of the target sticker, the fifth parameter and the sixth parameter.

In some embodiments, there may be a plurality of text elements, the first parameter includes a seventh parameter configured to represent a width occupied by each text element in the target sticker, the second parameter includes an eighth parameter configured to represent a height occupied by each text element in the target sticker, and correspondingly, the processing procedure of S21 may include: the width occupied by each text element in the target sticker is determined based on the seventh parameter corresponding to each text element; and the height occupied by each text element in the target sticker is determined based on the eighth parameter corresponding to each text element.

In some embodiments, the terminal may determine the width occupied by each text element in the target sticker based on the seventh parameter corresponding to each text element, and determine the height occupied by each text element in the target sticker based on the eighth parameter corresponding to each text element.

In some embodiments, the processing procedure of S23 may include: a maximum width between the width occupied by the text element in the target sticker and the width occupied by the background image element in the target sticker is determined as the width of the target sticker; and a maximum height between the height occupied by the text element in the target sticker and the height occupied by the background image element in the target sticker is determined as the height of the target sticker.

In some embodiments, the number of the text element is 1, the width occupied by the text element in the target sticker is w1, the height occupied by the text element in the target sticker is h1, the width occupied by the background image element in the target sticker is W1, and the height occupied by the background image element in the target sticker is H1, so the terminal may determine the maximum value between w1 and W1 as the width of the target sticker, and determine the maximum value between h1 and H1 as the height of the target sticker.

In some embodiments, there are a plurality of text elements, the widths occupied by the text elements in the target sticker are w1, w2, wn respectively, the heights occupied by the text elements in the target sticker are h1, h2, hn respectively, the width occupied by the background image element in the target sticker is W1, and the height occupied by the background image element in the target sticker is H1, so the terminal may determine the maximum value among w1, w2, wn, and W1 as the width of the target sticker, and determine the maximum value among h1, h2, hn, and H1 as the height of the target sticker.

Figure 3:
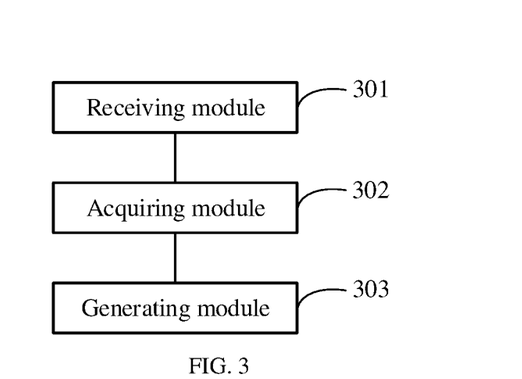
FIG. 3 illustrates a block diagram of a device for generating a sticker according to embodiments of the disclosure.

FIG. 3 illustrates a block diagram of a device for generating a sticker according to embodiments of the disclosure. Referring to FIG. 3, the device is applied to a terminal, and includes: a receiving module 301, an acquiring module 302 and a generating module 303.

The receiving module 301 is configured to receive a sticker configuration file from a server, wherein the sticker configuration file includes configuration parameters, and the configuration parameters represent display styles of a background image element and at least one text element in a target sticker to be generated.

The acquiring module 302 is configured to acquire a sticker background image and sticker characters input by a user as the background image element and the at least one text element respectively.

The generating module 303 is configured to generate the target sticker based on the background image element, the at least one text element and the configuration parameters.

In some embodiments, the sticker configuration file further includes an image identifier.

The acquiring module 302 is configured to acquire a corresponding image from the server as the sticker background image based on the image identifier; or receive an image selected by the user from locally stored images as the sticker background image.

In some embodiments, the configuration parameters include: a first parameter and a second parameter configured to represent a width and a height occupied by the at least one text element in the target sticker respectively, a third parameter and a fourth parameter configured to represent a width and a height occupied by the background image element in the target sticker respectively, a fifth parameter configured to represent a position of the at least one text element in the target sticker, and a sixth parameter configured to represent a position of the background image element in the target sticker.

The generating module 303 includes:
a first determining unit, configured to determine the width occupied by the at least one text element in the target sticker based on the first parameter, and determine the height occupied by the at least one text element in the target sticker based on the second parameter;
a second determining unit, configured to determine the width occupied by the background image element in the target sticker based on the third parameter, and determine the height occupied by the background image element in the target sticker based on the fourth parameter;
a third determining unit, configured to determine a width and a height of the target sticker based on the widths and the heights respectively occupied by the at least one text element and the background image element in the target sticker; and a generating unit, configured to generate the target sticker by performing position constraint on the at least one text element and the background image element, based on the width and the height of the target sticker, the fifth parameter and the sixth parameter.

In some embodiments, there are a plurality of text elements, the first parameter includes a seventh parameter, and the seventh parameter represents a width occupied by each of the at least one text element in the target sticker; and the second parameter includes an eighth parameter, and the eighth parameter represents a height occupied by the each text element in the target sticker.

The first determining unit is configured to:
determine the width occupied by the each text element in the target sticker based on the seventh parameter corresponding to the each text element; and
determine the height occupied by the each text element in the target sticker based on the eighth parameter corresponding to the each text element.

In some embodiments, the third determining unit is configured to:
determine a maximum width between the width occupied by the at least one text element in the target sticker and the width occupied by the background image element in the target sticker as the width of the target sticker; and determine a maximum height between the height occupied by the at least one text element in the target sticker and the height occupied by the background image element in the target sticker as the height of the target sticker.

The device for generating the sticker according to the embodiments of the disclosure can receive the sticker configuration file from the server, wherein the sticker configuration file includes the configuration parameters, and the configuration parameters represent the display styles of the background image element and the at least one text element in the target sticker to be generated; acquire the sticker background image and the sticker characters input by the user as the background image element and the at least one text element respectively; and generate the target sticker based on the background image element, the at least one text element and the configuration parameters. The sticker can be directly generated through the configuration file, the sticker generation mode is simplified, and thus the efficiency of generating the sticker can be improved.

Figure 4:
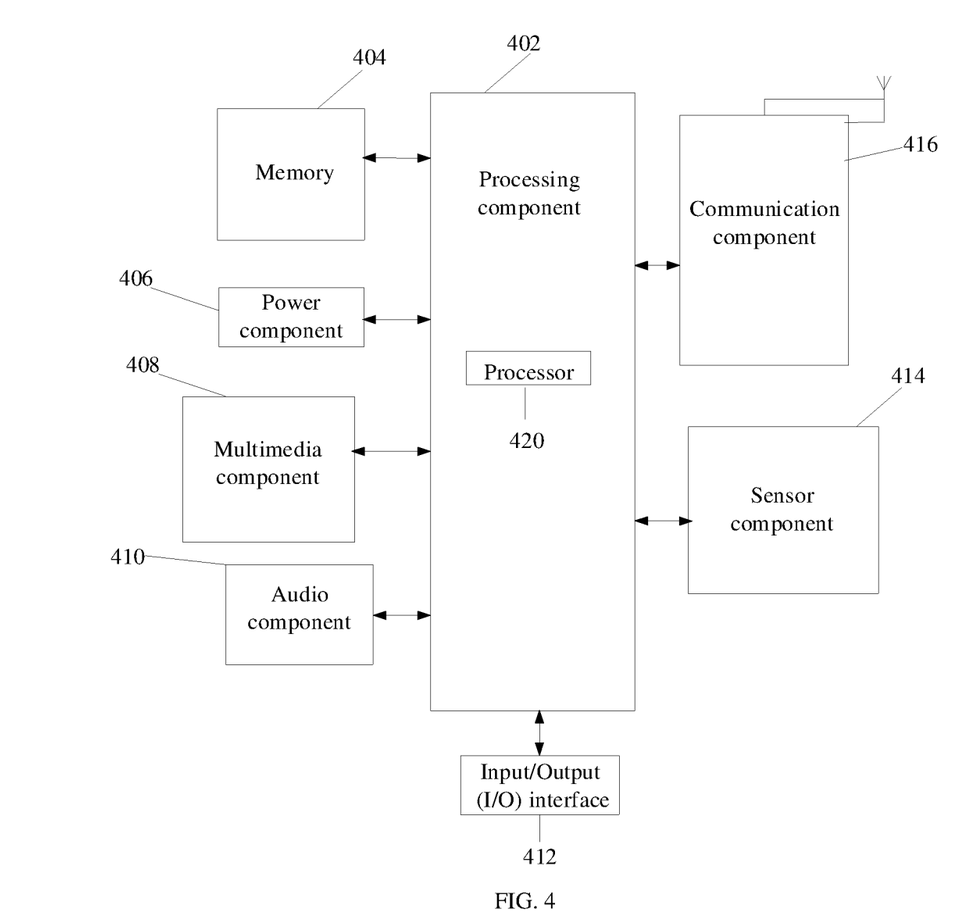
FIG. 4 illustrates a block diagram of a terminal for generating a sticker according to embodiments of the disclosure.

FIG. 4 illustrates a block diagram of a terminal for generating a sticker according to embodiments of the disclosure. For example, the terminal may be a mobile phone, a computer, a digital broadcast terminal, a messaging device, a gaming console, a tablet, a medical device, exercise equipment, a personal digital assistant, and the like.

Referring to FIG. 4, the terminal may include one or more of the following components: a processing component 402, a memory 404, a power component 406, a multimedia component 408, an audio component 410, an Input/Output (I/O) interface 412, a sensor component 414, and a communication component 416.

The processing component 402 typically controls overall operations of the terminal, such as operations associated with display, telephone calls, data communications, camera operations, and recording operations. The processing component 402 may include one or more processors 420 to execute instructions to complete all or part of the steps of the method for generating the sticker described above. In addition, the processing component 402 may include one or more modules to facilitate the interaction between the processing component 402 and other components. For example, the processing component 402 may include a multimedia module to facilitate the interaction between the multimedia component 408 and the processing component 402.

The memory 404 is configured to store various types of data to support operations at the terminal. Examples of such data include instructions for any applications or methods operated on the terminal, contact data, phonebook data, messages, pictures, video, etc. The memory 404 may be implemented by any type of volatile or non-volatile memory devices or combinations thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or a compact disk.

The power component 406 provides power to various components of the terminal. The power component 406 may include a power management system, one or more power sources, and any other components associated with the generation, management and distribution of power for the terminal.

The multimedia component 408 includes a screen providing an output interface between the terminal and a user. In some embodiments, the screen may include a liquid crystal display (LCD) and a touch panel (TP). If the screen includes the TP, the screen may be implemented as a touch screen to receive an input signal from the user. The touch panel includes one or more touch sensors to sense touch, sliding, and gestures on the touch panel. The touch sensors may not only sense a boundary of a touch or swipe action, but also detect duration and pressure related to the touch or swipe operation. In some embodiments, the multimedia component 408 includes a front camera and/or a rear camera. The front camera and/or the rear camera may receive external multimedia data when the terminal is in an operation mode, such as a photographing mode or a video mode. Each front camera and each rear camera may be fixed optical lens systems or may have focal lengths and optical zoom capabilities.

The audio component 410 is configured to output and/or input audio signals. For example, the audio component 410 includes a microphone (MIC) configured to receive an external audio signal when the terminal is in an operation mode, such as a call mode, a recording mode, and a voice recognition mode. The received audio signals may be further stored in the memory 404 or sent via the communication component 416. In some embodiments, the audio component 410 further includes a speaker configured to output audio signals.

The I/O interface 412 provides an interface between the processing component 402 and peripheral interface modules, such as a keyboard, a click wheel, or buttons. These buttons may include, but not limited to: a home button, a volume button, a start button, and a lock button.

The sensor component 414 includes one or more sensors configured to provide status assessments of various aspects of the terminal. For example, the sensor component 414 may detect an on/off state of the terminal and the relative positioning of the components such as a display and a keypad of the terminal, and the sensor component 414 may further detect the position change of the terminal or a component of the terminal, the presence or absence of contact between the user and the terminal, the orientation or acceleration/deceleration of the terminal, and the temperature change of the terminal. The sensor component 414 may include a proximity sensor configured to detect the existence of nearby objects under the situation of no physical contact. The sensor component 414 may further include an optical sensor, such as a CMOS or CCD image sensor, for use in an imaging application. In some embodiments, the sensor component 414 may further include an accelerometer sensor, a gyroscope sensor, a magnetic sensor, a pressure sensor, or a temperature sensor.

The communication component 416 is configured to facilitate a wired or wireless communication between the terminal and other devices. The terminal may access a wireless network based on a communication standard, such as WiFi, service provider networks (such as 2G, 3G, 4G or 5G), or combinations thereof. In some embodiments, the communication component 416 receives broadcast signals or broadcast related information from an external broadcast management system via a broadcast channel. In some embodiments, the communication component 416 further includes a near field communication (NFC) module to facilitate short-range communications. For example, the NFC module can be implemented based on a radio frequency identification (RFID) technology, an infrared data association (IrDA) technology, an ultra-wideband (UWB) technology, a bluetooth (BT) technology and other technologies.

In some embodiments, the terminal may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for implementing the above described method for generating the sticker.

In exemplary embodiments, there is also provided a storage medium including instructions, such as the memory 404 including instructions, executable by the processor 420 in the terminal, for implementing the method for generating the sticker described above. In some embodiments, the storage medium may be a non-transitory computer-readable storage medium. For example, the non-transitory computer-readable storage medium may be a read only memory (ROM), a random access memory (RAM), a compact disc read only memory (CD-ROM), a magnetic tape, a floppy disk, an optical data storage device, and the like.

In some embodiments, the embodiments of the disclosure further provide a computer program product, such as instructions included in the memory 404. When the computer program product is executed by the processor of the terminal, the terminal may implement the method for generating the sticker described above.

Other embodiments of the disclosure will be apparent to those skilled in the art from consideration of the specification and practice of the disclosure herein. The disclosure is intended to cover any variations, uses, or adaptations of the disclosure following the general principles thereof and including such departures from the disclosure as come within known or customary practice in the art. It is intended that the specification and embodiments are considered as exemplary only, with a true scope and spirit of the disclosure being indicated by the following claims.

It will be appreciated that the disclosure is not limited to the exact construction that has been described above and illustrated in the accompanying drawings, and that various modifications and changes may be made without departing from the scope thereof. It is intended that the scope of the disclosure is only limited by the appended claims.

What is claimed is:

1. A method for generating a sticker, applied to a terminal and comprising:
    receiving a sticker configuration file from a server, wherein the sticker configuration file comprises configuration parameters, and the configuration parameters represent display styles of a background image element and at least one text element in a target sticker to be generated;
    determining the background image element by acquiring a sticker background image;
    determining the at least one text element by acquiring a sticker character input by a user;
    determining a width of the target sticker by determining a maximum width between a width occupied by the at least one text element in the target sticker and a width occupied by the background image element in the target sticker;
    determining a height of the target sticker by determining a maximum height between a height occupied by the at least one text element in the target sticker and a height occupied by the background image element in the target sticker; and
    generating the target sticker to be added on a video played in the terminal based on the background image element, the at least one text element, the width and the height of the target sticker, and the configuration parameters,
    wherein the configuration parameters comprise:
        a stretching style of the background image element,
        a parameter indicating whether a width of the background image element is prohibited from shrinking to be within a width indicated by an imageWidth parameter when the background image element is stretched,
        a parameter indicating whether a height of the background image element is prohibited from shrinking to be within a height indicated by an imageHeight parameter when the background image element is stretched, and
        a position of the background image element in the target sticker.

2. The method according to claim 1, wherein the sticker configuration file further comprises an image identifier; and said acquiring the sticker background image comprises:
    acquiring a corresponding image from the server as the sticker background image based on the image identifier; or
    receiving an image selected by the user from locally stored images as the sticker background image.

3. The method according to claim 1, wherein the configuration parameters comprise:
    a first parameter and a second parameter configured to represent the width and the height occupied by the at least one text element in the target sticker respectively,
    a third parameter and a fourth parameter configured to represent the width and the height occupied by the background image element in the target sticker respectively,
    a fifth parameter configured to represent a position of the at least one text element in the target sticker, and
    a sixth parameter configured to represent a position of the background image element in the target sticker;
    wherein said generating the target sticker comprises:
        determining the width occupied by the at least one text element in the target sticker based on the first parameter, and determining the height occupied by the at least one text element in the target sticker based on the second parameter;
        determining the width occupied by the background image element in the target sticker based on the third parameter, and determining the height occupied by the background image element in the target sticker based on the fourth parameter; and
        generating the target sticker by performing position constraint on the at least one text element and the background image element, based on the width and the height of the target sticker, the fifth parameter and the sixth parameter,
    wherein the third parameter comprises:
        the stretching style of the background image element,
        the parameter indicating whether the width of the background image element is prohibited from shrinking to be within the width indicated by the imageWidth parameter when the background image element is stretched,
        the parameter indicating whether the height of the background image element is prohibited from shrinking to be within the height indicated by the imageHeight parameter when the background image element is stretched, and
        the position of the background image element in the target sticker.

4. The method according to claim 3,
    wherein the first parameter comprises a seventh parameter, and the seventh parameter represents a width occupied by each of the at least one text element in the target sticker; and the second parameter comprises an eighth parameter, and the eighth parameter represents a height occupied by the each text element in the target sticker;

wherein said determining the width and the height occupied by the at least one text element comprise:

determining the width occupied by the each text element in the target sticker based on the seventh parameter corresponding to the each text element; and determining the height occupied by the each text element in the target sticker based on the eighth parameter corresponding to the each text element.

5. A terminal, comprising:

a processor; and a memory, configured to store executable instructions of the processor;

wherein the processor is configured to execute the instructions to:

receive a sticker configuration file from a server, wherein the sticker configuration file comprises configuration parameters, and the configuration parameters represent display styles of a background image element and at least one text element in a target sticker to be generated;

determine the background image element by acquiring a sticker background image, and determine the at least one text element by acquiring a sticker character input by a user;

determine a width of the target sticker by determining a maximum width between a width occupied by the at least one text element in the target sticker and a width occupied by the background image element in the target sticker;

determine a height of the target sticker by determining a maximum height between a height occupied by the at least one text element in the target sticker and a height occupied by the background image element in the target sticker; and generate the target sticker to be added on a video played in the terminal based on the background image element, the at least one text element, the width and the height of the target sticker, and the configuration parameters, wherein the configuration parameters comprise:
 a stretching style of the background image element,
 a parameter indicating whether a width of the background image element is prohibited from shrinking to be within a width indicated by an imageWidth parameter when the background image element is stretched,
 a parameter indicating whether a height of the background image element is prohibited from shrinking to be within a height indicated by an imageHeight parameter when the background image element is stretched, and
 a position of the background image element in the target sticker.

6. The terminal according to claim 5, wherein the sticker configuration file further comprises an image identifier; and
 the processor is further configured to: acquire a corresponding image from the server as the sticker background image based on the image identifier, or receive an image selected by the user from locally stored images as the sticker background image.

7. The terminal according to claim 5, wherein the configuration parameters comprise:

a first parameter and a second parameter configured to represent the width and the height occupied by the at least one text element in the target sticker respectively, a third parameter and a fourth parameter configured to represent the width and the height occupied by the background image element in the target sticker respectively, a fifth parameter configured to represent a position of the at least one text element in the target sticker, and a sixth parameter configured to represent a position of the background image element in the target sticker;

wherein the processor is further configured to:

determine the width occupied by the at least one text element in the target sticker based on the first parameter, and determine the height occupied by the at least one text element in the target sticker based on the second parameter;

determine the width occupied by the background image element in the target sticker based on the third parameter, and determine the height occupied by the background image element in the target sticker based on the fourth parameter; and generate the target sticker by performing position constraint on the at least one text element and the background image element, based on the width and the height of the target sticker, the fifth parameter and the sixth parameter, wherein the third parameter comprises:
 the stretching style of the background image element,
 the parameter indicating whether the width of the background image element is prohibited from shrinking to be within the width indicated by the imageWidth parameter when the background image element is stretched,
 the parameter indicating whether the height of the background image element is prohibited from shrinking to be within the height indicated by the imageHeight parameter when the background image element is stretched, and
 the position of the background image element in the target sticker.

8. A non-transitory storage medium, wherein when instructions in the storage medium are executed by a processor of a terminal, the terminal implements the method for generating the sticker according to claim 1.

* * * * *